(12) United States Patent
Lauterbach et al.

(10) Patent No.: US 7,734,873 B2
(45) Date of Patent: Jun. 8, 2010

(54) CACHING OF MICROCODE EMULATION MEMORY

(75) Inventors: Gary Lauterbach, Los Altos, CA (US); Bruce R. Holloway, Boulder Creek, CA (US); Michael Gerard Butler, San Jose, CA (US); Sean Lie, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 401 days.

(21) Appl. No.: 11/754,589

(22) Filed: May 29, 2007

(65) Prior Publication Data

US 2008/0301364 A1    Dec. 4, 2008

(51) Int. Cl.
G06F 9/312 (2006.01)
G06F 12/14 (2006.01)

(52) U.S. Cl. .................. 711/129; 711/152; 711/163; 712/208

(58) Field of Classification Search .......... 711/129, 711/152, 163, 207; 712/208
See application file for complete search history.

(56) References Cited

U.S. PATENT DOCUMENTS

| | | | |
|---|---|---|---|
| 4,901,235 A | | 2/1990 | Vora et al. |
| 5,132,927 A | * | 7/1992 | Lenoski et al. ........... 365/49.16 |
| 5,278,973 A | | 1/1994 | O'brien et al. |
| 5,649,112 A | | 7/1997 | Yeager et al. |
| 5,671,356 A | | 9/1997 | Wang |
| 5,796,972 A | | 8/1998 | Johnson et al. |
| 5,826,052 A | * | 10/1998 | Stiles et al. .................. 712/205 |
| 5,864,689 A | | 1/1999 | Tran |
| 5,889,978 A | | 3/1999 | Jayakumar |

(Continued)

FOREIGN PATENT DOCUMENTS

WO    97/13194    1/1997

(Continued)

OTHER PUBLICATIONS

International Search Report and Written Opinion mailed Oct. 1, 2008 for International Application No. PCT/US2008/006746 filed May 28, 2008.

(Continued)

*Primary Examiner*—Matt Kim
*Assistant Examiner*—Hal Schnee
(74) *Attorney, Agent, or Firm*—Rory D. Rankin; Meyertons Hood Kivlin Kowert & Goetzel, P.C.

(57) ABSTRACT

A processor includes a cache hierarchy including a level-1 cache and a higher-level cache. The processor maps a portion of physical memory space to a portion of the higher-level cache, executes instructions, at least some of which comprise microcode, allows microcode to access the portion of the higher-level cache, and prevents instructions that do not comprise microcode from accessing the portion of the higher-level cache. The first portion of the physical memory space can be permanently allocated for use by microcode. The processor can move one or more cache lines of the first portion of the higher-level cache from the higher-level cache to a first portion of the level-1 cache, allow microcode to access the first portion of the first level-1 cache, and prevent instructions that do not comprise microcode from accessing the first portion of the first level-1 cache.

20 Claims, 5 Drawing Sheets

U.S. PATENT DOCUMENTS

| | | | |
|---|---|---|---|
| 5,950,012 A * | 9/1999 | Shiell et al. | 717/169 |
| 6,125,412 A | 9/2000 | Picard et al. | |
| 6,141,740 A | 10/2000 | Mahalingaiah et al. | |
| 6,397,301 B1 * | 5/2002 | Quach et al. | 711/138 |
| 6,643,800 B1 | 11/2003 | Safford et al. | |
| 6,745,306 B1 * | 6/2004 | Willman et al. | 711/163 |
| 6,754,765 B1 * | 6/2004 | Chang et al. | 711/103 |
| 7,095,342 B1 | 8/2006 | Hum et al. | |
| 7,370,243 B1 * | 5/2008 | Grohoski et al. | 714/48 |
| 2001/0052066 A1 * | 12/2001 | Lee et al. | 712/248 |
| 2002/0069328 A1 * | 6/2002 | Chauvel | 711/130 |
| 2005/0055510 A1 * | 3/2005 | Hass et al. | 711/133 |
| 2005/0188156 A1 * | 8/2005 | Mukker et al. | 711/129 |
| 2006/0174079 A1 | 8/2006 | Kajihara | |
| 2008/0256336 A1 * | 10/2008 | Henry et al. | 712/208 |
| 2008/0263339 A1 * | 10/2008 | Kriegel et al. | 712/228 |

OTHER PUBLICATIONS

Jacob, et al. "A look at several memory management units, TLB-refill mechanisms, and page table organizations" ACM Proceedings of ASPLOS-VIII, San Jose, CA USA, Oct. 3-7, 1998, pp. 295-306.

\* cited by examiner

CACHING OF MICROCODE EMULATION MEMORY

BACKGROUND OF THE INVENTION

1. Field of the Invention

This invention relates to microprocessors and, more particularly, to emulation of complex instructions by microcode, and still more particularly, to caching of memory used during such emulation.

2. Description of the Related Art

While it is desirable for microprocessors to maintain compatibility with a complex instruction set computer (CISC) architecture, other architectures offer improved execution speed and performance. Microprocessor designers have attempted to achieve both CISC compatibility and high performance by emulating CISC instructions. For example, superscalar, reduced instruction set computer (RISC) architectures may include microcode that performs CISC instruction emulation. During the emulation process, microcode makes use of a scratchpad memory for saving intermediate values. To maintain high performance, it is desirable for a microprocessor's microcode to be able to access the emulation memory as quickly as possible.

In addition, microprocessors commonly include multiple memory caches, arranged hierarchically and shared by multiple cores or execution units. A variety of caching architectures are used and include various combinations of on-chip cache and off-chip cache. Memory operations that read data from cache or memory may be referred to more succinctly herein as "loads". Memory operations that write data to cache or memory may be referred to more succinctly herein as "stores". A load or a store may target a particular cache line (or portion of a cache line) and include an address identifying the targeted line as well as including data to be loaded from or stored within the cache line. Since cache accesses are faster than memory accesses, various caching techniques are used to increase the likelihood that data is located in a cache when a core or execution unit needs to access it, thereby improving execution speed. Consequently caching the microcode emulation memory offers the performance advantage of the relatively faster access time of cache memory compared to system memory. The shortest access times are generally those associated with the lowest level of the cache hierarchy, commonly referred to as L1-cache, or simply L1. Therefore, it is desirable to cache the microcode emulation memory in L1. Such performance advantages have often been reinforced by the permanent allocation of a portion of L1 for microcode emulation memory.

Of course, the performance advantages of using the L1-cache would benefit other processes as well. Consequently, it is desirable to make the L1-cache as large as possible to increase the availability of L1-cache space for any process. However, increasing the size of L1 increases the cost and complexity of the microprocessor. Also, if the microcode emulation memory is permanently allocated in L1, this portion of L1 is not available to other processes. In order to address the above concerns, what is needed is a way to improve availability of space in a given size L1-cache to all processes while maintaining the advantages of caching the microcode emulation memory.

SUMMARY OF THE INVENTION

Various embodiments of a processor, a computer system, and methods are disclosed. The processor includes a cache hierarchy including at least a first level-1 cache and a higher-level cache. The processor is configured to map a first portion of a physical memory space to a first portion of the higher-level cache, execute instructions, at least some of which comprise microcode, allow microcode to access the first portion of the higher-level cache, and prevent instructions that do not comprise microcode from accessing the first portion of the higher-level cache. In one embodiment, the higher-level cache is a level-2 cache. In another embodiment, the first portion of the physical memory space is permanently allocated for use by microcode.

In a further embodiment, the processor is configured to move one or more cache lines of the first portion of the higher-level cache from the higher-level cache to a first portion of the first level-1 cache. The processor is further configured to allow microcode to access the first portion of the first level-1 cache and prevent instructions that do not comprise microcode from accessing the first portion of the first level-1 cache.

In a still further embodiment, the processor is configured to detect a microcode access signal. The processor is further configured to prevent instructions from accessing the first portion of the physical memory space if the microcode access signal is not asserted and allow instructions to access the first portion of the physical memory space if the microcode access signal is asserted.

In a still further embodiment, the processor includes a translation lookaside buffer (TLB), wherein to prevent instructions that do not comprise microcode from accessing the first portion of the physical memory space the processor is further configured to disallow TLB refills to the first portion of the physical memory space.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
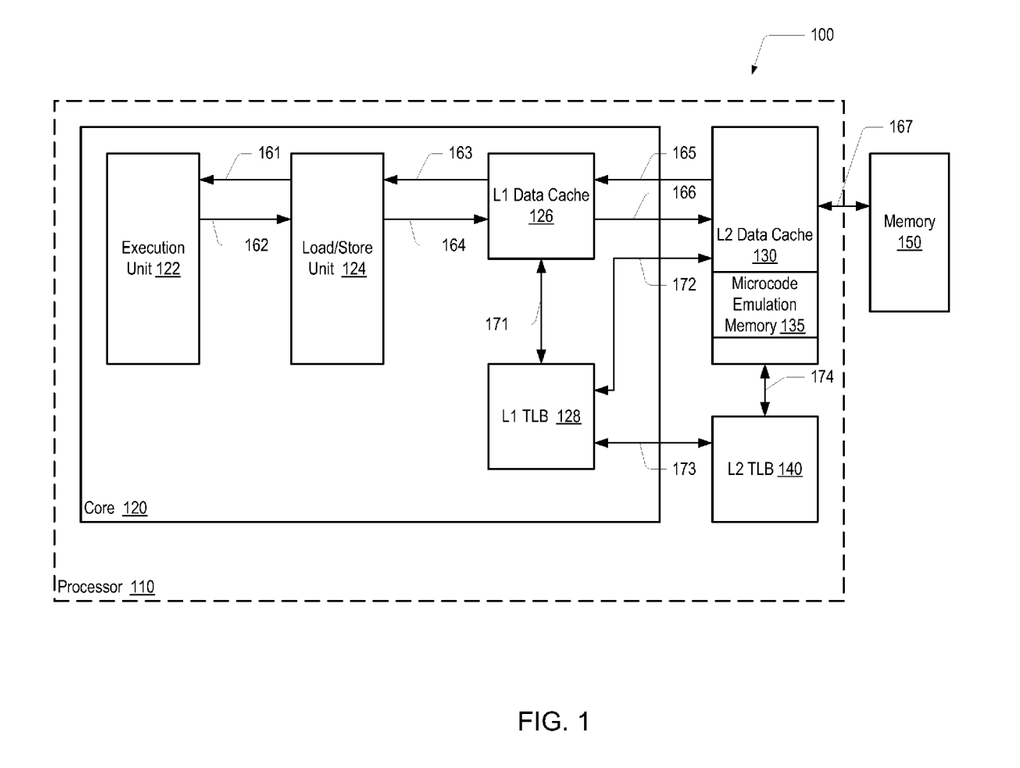
FIG. 1 is a generalized block diagram of one embodiment of a computer system.

FIG. 1 is a generalized block diagram of one embodiment of a computer system 100. In the illustrated embodiment, processor 110 is shown coupled to a memory 150. Memory 150 may include SDRAM, SRAM, ROM, DRAM and/or other conventional memory devices. Processor 110 includes a core 120, an L2 data cache 130, and an L2 translation lookaside buffer (TLB) 140. Core 120 includes an execution unit 122, a load/store unit 124, an L1 data cache 126, and an L1 TLB 128. L2 data cache 130 includes a microcode emulation memory 135. In alternative embodiments, processor 110 may include more than one core, each core including a level-1 data cache and each core sharing a single level-2 data cache. In one alternative embodiment, L1 data cache 126 may be separate from core 120. In other alternative embodiments, additional cache levels may be included in computer system 100, such as a level-3 cache, either included in processor 110 or separate from processor 110. In these and other alternative embodiments, microcode emulation memory 135 may be included in any cache level above level-1. A variety of other embodiments are also contemplated. However, for ease of understanding, the examples that follow will assume that space is permanently allocated in a level-2 data cache for microcode emulation memory 135.

During operation, execution unit 122 may receive the data portion of loads to be executed from load/store unit 124 via link 161 and convey the data portion of stores to load/store unit 124 via link 162. Load/store unit 124 may receive the data portion of loads to be executed from L1 data cache 126 via link 163 and convey the data portion of stores to L1 data cache 126 via link 164. L1 data cache 126 may receive the data portion of loads from L2 data cache 130 via link 165 and convey the data portion of stores to L2 data cache 130 via link 166. L2 data cache 130 may receive the data portion of loads from and convey the data portion of stores to memory 150 via link 167. L1 TLB 128 is shown coupled to L1 data cache 126 via link 171, to L2 data cache 130 via link 172, and to L2 TLB 140 via link 173. L2 TLB 140 is also shown coupled to L2 data cache 130 via link 174.

L1 data cache 126, L1 TLB 128, L2 data cache 130, and L2 TLB 140 may perform conventional address translation and caching functions. For example, L1 TLB 128 may cache mappings of virtual addresses to physical addresses. When a memory access request occurs, L1 TLB 128 may be checked to see if a mapping of the desired virtual address to a physical address is cached. Mappings cached in L1 TLB 128 may be used to determine if a desired cache line is present in L1 data cache 126. If a desired cache line is not present in L1 data cache 126, i.e., there is an L1 cache miss, L2 TLB 140 may be checked to see if a mapping of the desired virtual address to a physical address is cached. Mappings cached in L2 TLB 140 may be used to determine if a desired cache line is present in L2 data cache 130. When a cache miss occurs in L1 data cache 126, in order to make room for a new entry, a cache line may be evicted from L1 data cache 126 to L2 data cache 130. A corresponding entry in L1 TLB 128 may be moved to L2 TLB 140. In order to make room for a new entry in L2 data cache 130, it may be necessary to evict a cache line from L2 data cache 130 to memory 150. A new address translation may be performed for the desired cache line and the result cached in L1 TLB 128, a process that may be referred to as a TLB refill. Further details of the operation of data caches 126 and 130 and TLBs 128 and 140 that account for and avoid corruption of microcode emulation memory 135 are presented below.

Figure 2:
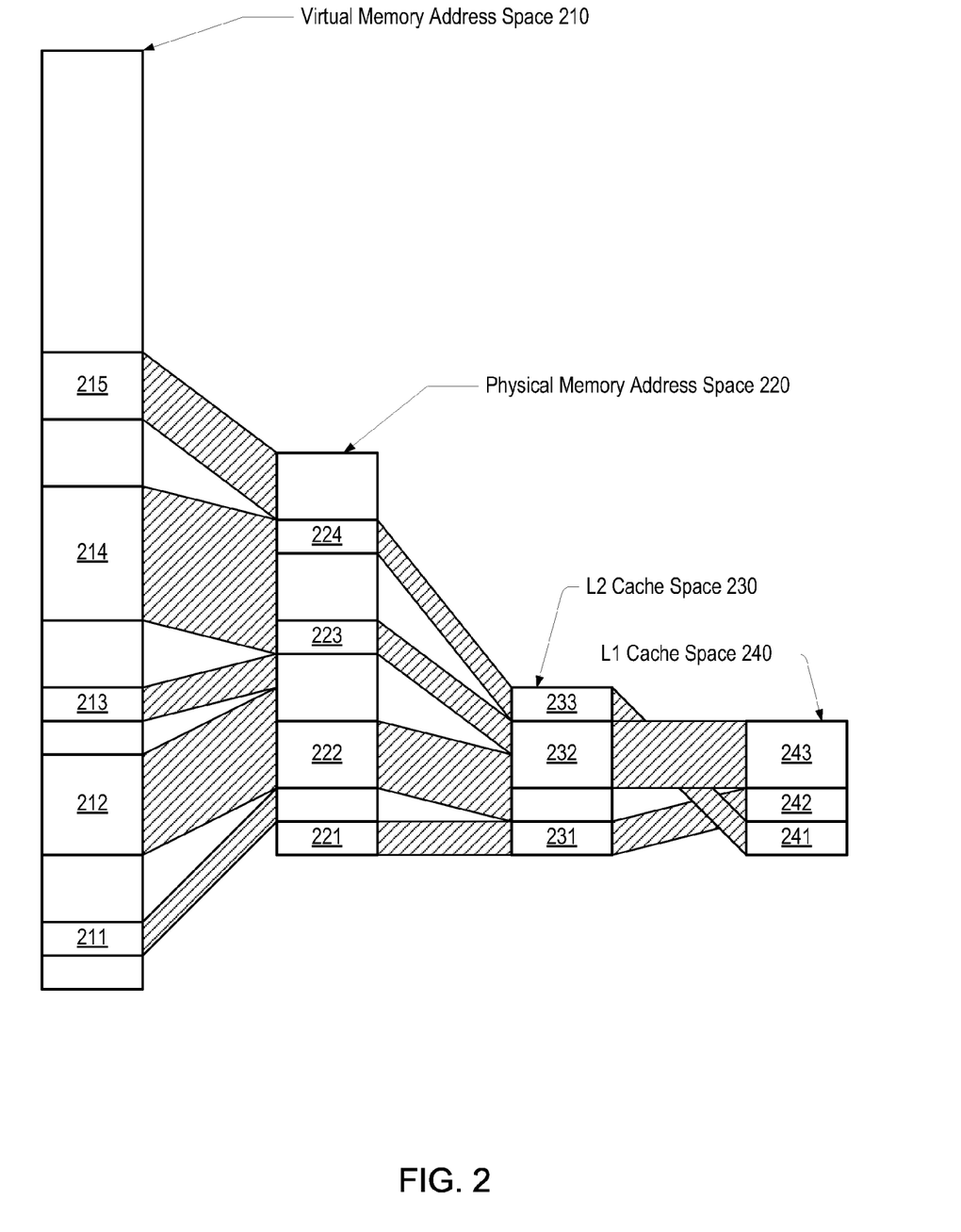
FIG. 2 illustrates one embodiment of a virtual memory and cache architecture.

FIG. 2 illustrates one embodiment of a virtual memory and cache architecture that may be used with processor 110. In the illustration, a virtual memory space 210 is shown, portions of which are mapped to a physical memory address space 220. Portions of physical memory address space 220 are shown mapped to L2 cache space 230, portions of which are in turn mapped to L1 cache space 240. Each application that executes on processor 110 may employ a separate virtual memory address space. Virtual memory address space 210, as shown in FIG. 2, includes blocks 211-215 that represent the portions of virtual memory that are mapped to physical memory address space 220 and are available to be accessed by an application at a given point in time. Similarly, physical memory address space 220 includes blocks 221-224 that represent the portions of physical memory that are cached in L2 cache space 230. Likewise, L2 cache space 230 includes blocks 231-233 that represent the portions of L2 cache that are cached in L1 cache space 240. More particularly, blocks 231, 232, and 233 of L2 cache space 230 are mapped to blocks 242, 243, and 241 of L1 cache space 240, respectively. In various embodiments, each block described above may represent one of a set of cache lines, blocks of a uniform size, a group of cache lines or blocks, or blocks of varying sizes. In alternative embodiments, any of virtual memory address space 210, physical memory address space 220, L2 cache space 230, and L1 cache space 240 may include more or fewer blocks than the number shown in FIG. 2.

In one embodiment, block 221 may be reserved in physical memory space 220 as microcode emulation memory. Further, block 231 of L2 cache space 230 may be permanently reserved for caching the contents of microcode emulation memory. During operation, when processor 110 desires to access microcode emulation memory, block 231 may be cached in level 1 cache, such as in block 242, as shown in FIG. 2. However, block 242 may not be permanently reserved for the use of microcode emulation memory, as is block 231. The blocks that are cached in L1 may change from time to time, depending on program execution. Accordingly, microcode emulation memory may be evicted from L1 to L2, where block 231 is reserved for its use. In one embodiment, access to microcode emulation memory by applications or processes other than microcode may be prevented by disallowing L1 TLB refills involving block 221 of physical memory space.

Figure 3:
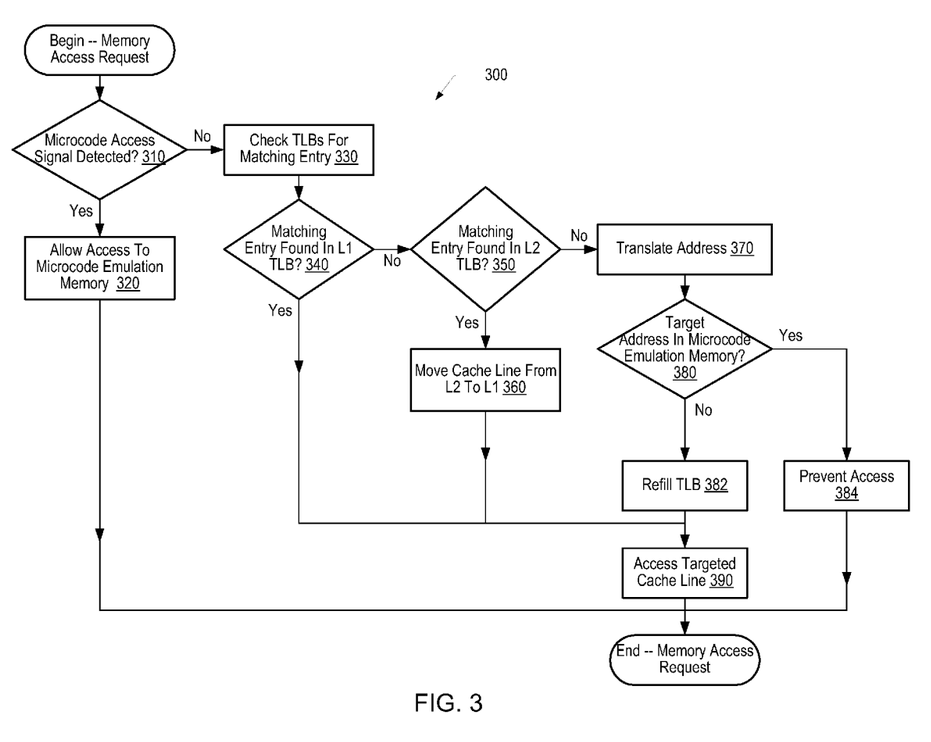
FIG. 3 illustrates one embodiment of a process for accessing a memory hierarchy including microcode emulation memory.

FIG. 3 illustrates one embodiment of a process 300 for accessing a memory hierarchy including microcode emulation memory. A memory access may begin with a check for the presence of a microcode access signal (not shown) associated with each instruction decoded by an execution unit (decision block 310). For example, in one embodiment, a bit of each decoded instruction may be used as a microcode access signal. In an alternative embodiment, microcode instructions may have a special opcode that serves as a microcode access signal and by which they may be identified as microcode. Any of a variety of alternative microcode access signals may be conveyed from an execution unit to a cache controller to indicate whether or not an instruction is a microcode instruction. If a microcode access signal is detected, then access to the microcode emulation memory may be allowed (block 320) and the access is completed.

If the microcode access signal is not detected, process 300 may proceed as follows. One or more TLBs may be searched to find an entry matching the cache line targeted by the access (block 330). If a matching entry is found in an L1 TLB (decision block 340), then the targeted cache line may be accessed (block 390) and the access is completed. If a matching entry is not found in an L1 TLB but is found in an L2 TLB (decision block 350), then the targeted cache line may be moved from the L2 cache to the L1 cache (block 360), the targeted cache line may be accessed (block 390), and the access is completed. If a matching entry is not found in either L1 or L2 cache, then an address translation may be performed (block 370). If the result of the address translation produces a target address that is located in the microcode emulation memory (decision block 380), then the access may be prevented (block 384) ending the access attempt. If the result of the address translation produces a target address that is not located in the microcode emulation memory (decision block 380), then a TLB refill may be performed (block 382), the targeted cache line may be accessed (block 390), and the access is completed.

Figure 4:
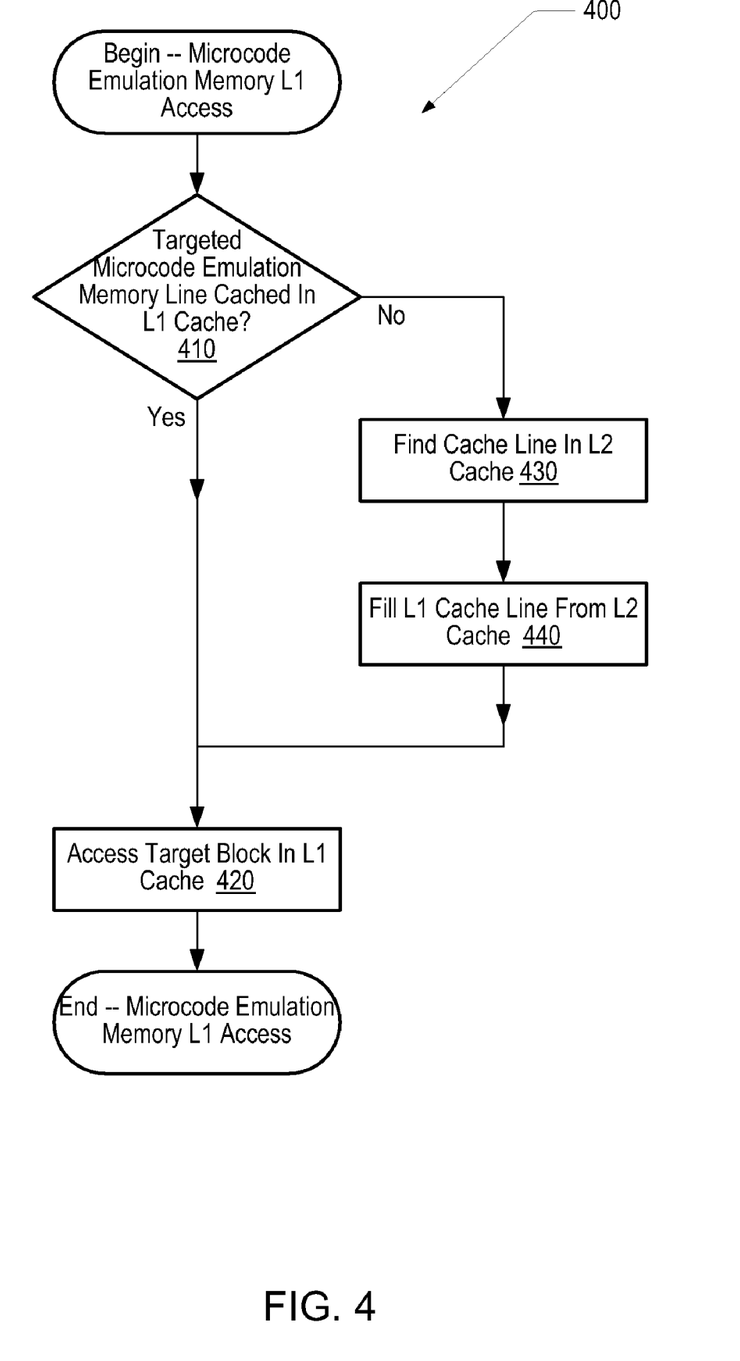
FIG. 4 illustrates one embodiment of a process for accessing microcode emulation memory in a level-1 cache.

FIG. 4 illustrates one embodiment of a process 400 for accessing microcode emulation memory in a level-1 cache. An access request targeted to microcode emulation memory may begin with a check to see if the targeted cache line is cached in an L1 cache (decision block 410). If so, access to the targeted cache line may be allowed (block 420) and the access is completed. If the targeted cache line is not cached in an L1 cache, then the reserved location of the targeted cache line in L2 cache may be obtained (block 430) The targeted cache line may then be moved from L2 cache to L1 cache (block 440). Once the target cache line is moved to L1 cache, access may be allowed (block 420) and the access is completed.

Figure 5:
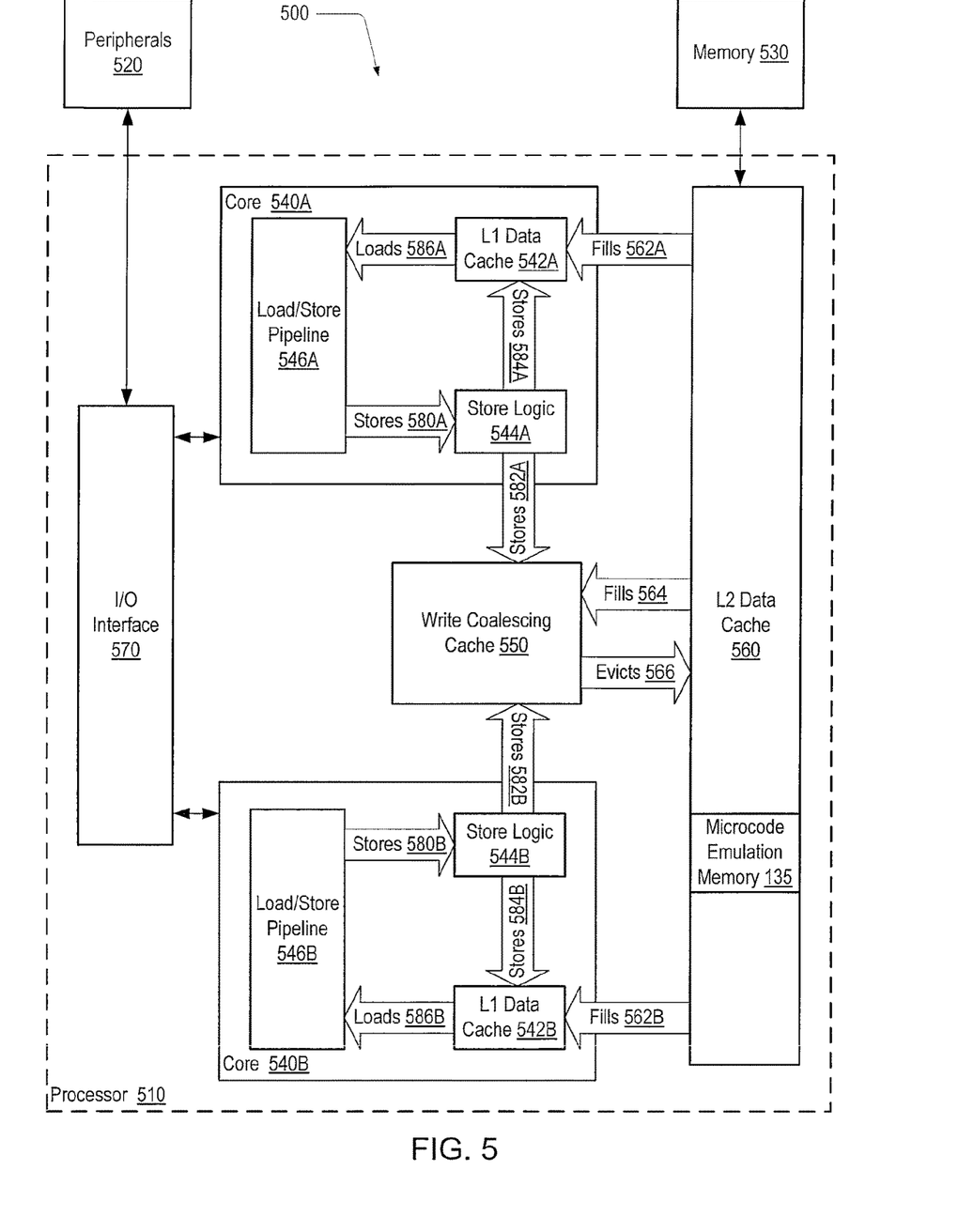
FIG. 5 is a block diagram of one embodiment of a computer system including a L2 data cache and microcode emulation memory coupled to a variety of system components.

Turning now to FIG. 5 a block diagram of one embodiment of a computer system 500 including L2 data cache 560 and microcode emulation memory 135 coupled to a variety of system components is shown. In the depicted system, processor 510 is shown coupled to peripherals 520 and to a memory 530. Peripherals 520 may include any of a variety of devices such as network interfaces, timing circuits, storage media, input/output devices, etc. that may be found in a conventional computer system. Memory 530 may include SDRAM, SRAM, ROM, DRAM and/or other conventional memory devices. Processor 510 includes cores 540A and 540B, write coalescing cache 550, level-2 data cache 560, and I/O interface 570. I/O interface 570 may couple each of cores 540 to peripherals 520. Elements referred to herein by a reference numeral followed by a letter may be collectively referred to by the reference numeral alone. For example, cores 540A and 540B may be referred to as cores 540 and an unspecified one of cores 540 may be referred to as a core 540.

Each of cores 540 includes a level-1 data cache 542, a store logic unit 544, and a load/store pipeline 546. Store logic unit 544 (alternately referred to as "store unit") may represent a portion of a load/store unit, a separate logic unit, or a combination thereof. Store logic 544 is coupled to both level-1 data cache 542 and write coalescing cache 550 to enable core 540 to write to either cache level. More specifically, store logic 544 may convey stores 584 to level-1 data cache 542 and stores 582 to write coalescing cache 550. Write coalescing cache 550 may be further coupled to level-2 data cache 560 via fills 564 and evicts 566. Write coalescing cache 550 may coalesce stores 582 with fills 564 to produce a reduced number of evicts 566. Level-2 data cache 560 may be further coupled to each level-1 data cache 542. More specifically, level-2 data cache 560 may convey fills 562 to level-1 data cache 542. Level-2 data cache 560 may also be bi-directionally coupled to memory 530.

During operation, core 540 may execute a stream of instructions that, when decoded, cause loads 586 from L1 data cache 542 to load/store pipeline 546 and/or stores 580 from load/store pipeline 546 to store logic 544. The instructions executed by core 540 may include execution of microcode. When microcode execution requires access to a cache line in microcode emulation memory 135, the targeted cache line may be accessed and, if necessary, moved from L2 data cache 560 to L1 data cache 542 using the process described in FIG. 4 above. Once the targeted cache line is moved to L1 data cache 542, it may be accessed via loads 586 and/or stores 580 and 584.

Although system 500, as shown, include two cores, in alternative embodiments more than two cores may be included and/or each core may represent a cluster of execution units. Additional level-2 caches may also be included in further alternative embodiments in which more than two cores are included. Further, although level-2 data cache 560 is shown coupled directly to memory 530 and memory 530 is shown as off-processor memory, processor 510 may include a memory controller and/or on-processor memory. Alternatively, an off-processor memory controller may couple level-2 data cache 560 to memory 530. A variety of processor core and memory configurations will be apparent to one of ordinary skill in the art.

It is noted that the above-described embodiments may comprise software. In such an embodiment, the program instructions that implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
   a cache hierarchy including at least a first level-1 cache and a higher-level cache;
   wherein the processor is configured to:
      map a first portion of a physical memory space to a first portion of the higher-level cache;
      execute instructions, at least some of which comprise microcode;
      decode a first instruction of the instructions;
      wherein if a microcode access signal is detected responsive to said decode of the first instruction, determine the first instruction represents microcode and allow the first instruction to access the first portion of the higher-level cache; and
      wherein if a microcode access signal is not detected responsive to said decode of the first instruction, determine the first instruction does not represent microcode and prevent the first instruction from accessing the first portion of the higher-level cache.

2. The processor of claim 1, wherein the higher-level cache is a level-2 cache.

3. The processor of claim 1, wherein the first portion of the physical memory space is permanently allocated for use by microcode.

4. The processor of claim 1, wherein the processor is further configured to:
   move one or more cache lines of the first portion of the higher-level cache from the higher-level cache to a first portion of the first level-1 cache;
   allow microcode to access the first portion of the first level-1 cache; and
   prevent instructions that do not comprise microcode from accessing the first portion of the first level-1 cache.

5. The processor of claim 1, wherein the processor is further configured to determine said first instruction represents microcode during said decode by detecting one or more bits of the first instruction have a predetermined state.

6. The processor of claim 5, further comprising a translation lookaside buffer (TLB), wherein to prevent instructions that do not comprise microcode from accessing the first portion of the physical memory space the processor is further configured to disallow TLB refills to the first portion of the physical memory space.

7. The processor of claim 1, further comprising at least a first core and a second core, wherein the second core is configured to:
map a second portion of the physical memory space to a second portion of the higher-level cache;
execute instructions, at least some of which comprise microcode;
allow microcode to access the second portion of the higher-level cache; and
prevent instructions that do not comprise microcode from accessing the second portion of the higher-level cache.

8. The processor of claim 7, wherein the first core includes the first level-1 cache and the second core includes a second level-1 cache;
wherein the first core is further configured to:
move one or more cache lines that are mapped to the first portion of the higher-level cache, from the higher-level cache to a portion of the first level-1 cache;
allow microcode to access the portion of the first level-1 cache; and
prevent instructions that do not comprise microcode from accessing the portion of the first level-1 cache; and
wherein the second core is further configured to:
move one or more cache lines that are mapped to the second portion of the higher-level cache, from the higher-level cache to a portion of the second level-1 cache;
allow microcode to access the portion of the second level-1 cache; and
prevent instructions that do not comprise microcode from accessing the portion of the second level-1 cache.

9. A method comprising:
mapping a first portion of a physical memory space to a first portion of a higher-level cache in a cache hierarchy of a processor;
a first processor core executing instructions, at least some of which comprise microcode;
decoding a first instruction of the instructions;
wherein if a microcode access signal is detected responsive to said decoding of the first instruction, determining the first instruction represents microcode and allowing the first instruction to access the first portion of the higher-level cache; and
wherein if a microcode access signal is not detected responsive to said decoding of the first instruction, determining the first instruction does not represent microcode and prevent the first instruction from accessing the first portion of the higher-level cache.

10. The method of claim 9, wherein the higher-level cache is a level-2 cache.

11. The method of claim 9, further comprising permanently allocating the first portion of the physical memory space for use by microcode.

12. The method of claim 9, further comprising:
moving one or more cache lines of the first portion of the higher-level cache from the higher-level cache to a first portion of a first level-1 cache of the processor;
allowing microcode to access the first portion of the first level-1 cache; and
preventing instructions that do not comprise microcode from accessing the first portion of the first level-1 cache.

13. The method of claim 9, further comprising:
determining said first instruction represents microcode during said decoding by detecting one or more bits of the first instruction have a predetermined state.

14. The method of claim 13, wherein preventing instructions from accessing the first portion of the physical memory space if the microcode access signal is not asserted further comprises disallowing refills to the first portion of the physical memory space from a translation lookaside buffer (TLB).

15. The method of claim 9, further comprising:
mapping a second portion of the physical memory space to a second portion of the higher-level cache;
a second processor core executing instructions, at least some of which comprise microcode;
the second processor core allowing microcode to access the second portion of the higher-level cache; and
the second processor core preventing instructions that do not comprise microcode from accessing the second portion of the higher-level cache.

16. The method of claim 15, further comprising:
moving one or more cache lines that are mapped to the first portion of the higher-level cache, from the higher-level cache to a portion of a first level-1 cache;
moving one or more cache lines that are mapped to the second portion of the higher-level cache, from the higher-level cache to a portion of a second level-1 cache;
allowing microcode to access the portion of the first level-1 cache and/or the portion of the second level-1 cache;
preventing instructions that do not comprise microcode from accessing the portion of the first level-1 cache; and
preventing instructions that do not comprise microcode from accessing the portion of the second level-1 cache.

17. A computer system comprising:
at least one processor coupled to a memory and one or more peripheral devices;
wherein the at least one processor comprises a cache hierarchy including at least a first level-1 cache and a higher-level cache;
wherein the at least one processor is configured to:
map a first portion of a physical memory space to a first portion of the higher-level cache;
execute instructions, at least some of which comprise microcode;
decode a first instruction of the instructions;
wherein if a microcode access signal is detected responsive to said decode of the first instruction, determine the first instruction represents microcode and allow the first instruction to access the first portion of the higher-level cache; and
wherein if a microcode access signal is not detected responsive to said decode of the first instruction, determine the first instruction does not represent microcode and prevent the first instruction from accessing the first portion of the higher-level cache.

18. The computer system of claim 17, wherein the at least one processor is further configured to:
move one or more cache lines of the first portion of the higher-level cache from the higher-level cache to a first portion of the first level-1 cache;
allow microcode to access the first portion of the first level-1 cache; and
prevent instructions that do not comprise microcode from accessing the first portion of the first level-1 cache.

19. The computer system of claim 17, wherein the at least one processor is further configured to: determine said first instruction represents microcode during said decode by detecting one or more bits of the first instruction have a predetermined state.

20. The computer system of claim 17, wherein the at least one processor further comprises a translation lookaside buffer (TLB), wherein to prevent instructions that do not comprise microcode from accessing the first portion of the physical memory space the at least one processor is further configured to disallow TLB refills to the first portion of the physical memory space.

* * * * *